No. 743,264. Patented November 3, 1903.

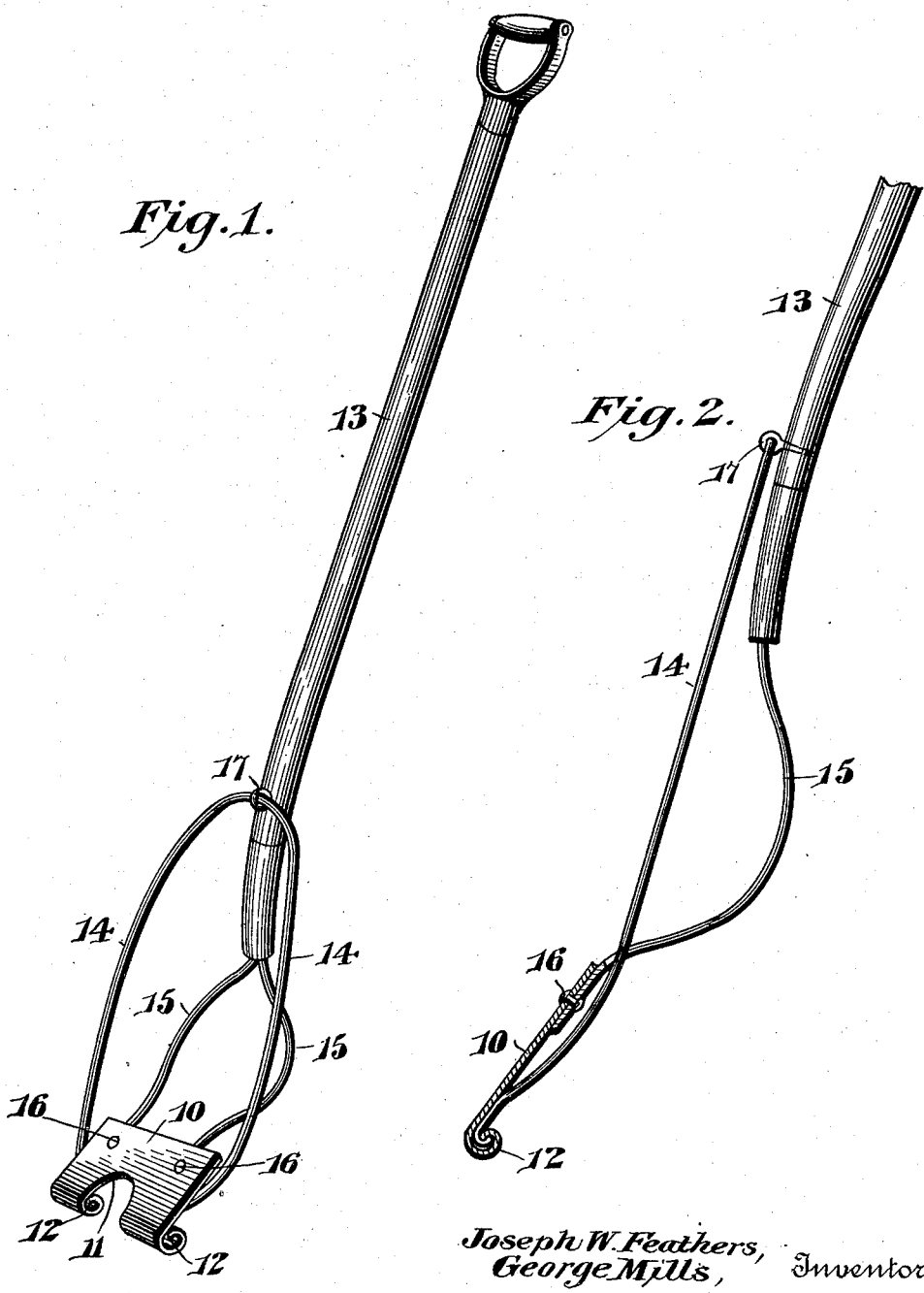

UNITED STATES PATENT OFFICE.

JOSEPH W. FEATHERS AND GEORGE MILLS, OF ALBION, NEW YORK.

HARVESTING IMPLEMENT.

SPECIFICATION forming part of Letters Patent No. 743,264, dated November 3, 1903.

Application filed August 22, 1902. Serial No. 120,708. (No model.)

*To all whom it may concern:*

Be it known that we, JOSEPH W. FEATHERS and GEORGE MILLS, citizens of the United States, residing at Albion, in the county of Orleans and State of New York, have invented a new and useful Harvesting Implement, of which the following is a specification.

The present invention relates to improvements in harvesting implements for cabbages and similar vegetables; and the object is to provide a simple and easily-manufactured article by means of which a vegetable may be cut from its stalk without being injured. With implements now in general use for cutting cabbages it very often happens that a portion of the base is cut off with the stem, and it is aimed to overcome this very objection.

Another feature resides in the means for securing the cutting-blade to a handle, this means constituting a basket to receive the head after it has been severed from the stalk.

The preferred embodiment of the invention is illustrated in the accompanying drawings and described in the following specification, though it will be seen upon examining the claims hereto appended that the structure set forth is open to various changes and modifications.

In the drawings, Figure 1 is a perspective view of the implement. Fig. 2 is an enlarged view through the same.

Similar numerals of reference indicate corresponding parts in both figures of the drawings.

In the illustrated embodiment a plate 10 is employed, which is preferably formed of sheet metal and has a seat or notch 11 in its forward portion, the edges of said notch being sharpened sufficiently to cut through a cabbage or other vegetable stalk. The portions on opposite sides of the notch are rolled or coiled under, as shown at 12, thereby providing blunt guard edges and also constituting supports or runners for the plate. In connection with this plate there is employed a handle 13, which may be of any desired shape and material, said handle being attached to the plate 10 by means of spaced sets of arms 14 and 15. The arms 15 are bowed laterally and depressed rearwardly and have their upper ends embedded in the lower end of the handle, their lower ends being riveted, as shown at 16, to the under face of the plate 10. The arms 14 are formed from a looped wire, the upper portion being attached to the front face of the handle by means of an eye or staple 17, the lower ends embracing the plate and being secured within the coiled portions 12, as clearly shown in Fig. 2. These arms thus form a basket above the plate 10, the arms 15 constituting the bottom thereof, while the arms 14 form the side walls, said arms 15 being suitably curved to afford sufficient space for the head of a cabbage or other vegetable.

In harvesting cabbages the implement is placed upon the ground beneath the head with the notch or seat 11 alined with the stalk, and a forward movement is then given to the same, whereupon the cutting edge of the notch will sever the head from the stalk, and the former will drop into the basket, whereupon by lifting the implement said head may be thrown into a vehicle or deposited in any convenient place. It will be apparent that this structure will sever a head of cabbage or a similarly-shaped vegetable from its stalk without injuring the head, as the guard portions 12 will not cut, but will guide the plate to its proper place with relation to the stalk. The structure, moreover, is very simple, and it will be seen that it can be manufactured at small cost. The arms besides constituting a basket rigidly support the plate and hold it against unnecessary vibrating or bending when in use.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention. For instance, the arm 14 need not be actually connected to the handle, but may be made sufficiently rigid to rest thereon without having a direct connection. We consider ourselves the first to utilize the connecting means between the blade and the handle as a receiving-basket without reference to the particular construction shown.

Having thus described our invention, what we claim as new, and desire to secure by Letters Patent, is—

1. In a vegetable-harvesting instrument of the class described, the combination with a handle, of a forwardly-projecting plate connected to the lower end of the handle, said plate having an intermediate cutting edge, and blunt guard edges located on opposite sides of the cutting edge.

2. In a vegetable-harvesting instrument of the class described, the combination with a handle, of a cutting-plate having a forwardly-extending cutting edge at its front end, and blunt guard edges formed of flanges arranged upon the opposite sides of the cutting edge.

3. In a harvesting implement of the class described, a plate having an intermediate cutting edge, the portions on opposite sides of the cutting edge being rolled to form blunt guard edges.

4. In a harvesting implement of the class described, a blade having an intermediate notch in one edge, the portions on opposite sides of the notch being rolled beneath the plate to form blunt guard edges.

5. In a vegetable-harvesting implement of the class described, the combination with a handle, of a forwardly-extending cutting-blade spaced from the lower end of the handle, and brace-arms attached to the front and rear portions of the blade and connected to the handle, said arms constituting an open-topped receiving-basket in rear of the blade for the articles cut by the blade.

6. In a vegetable-harvesting implement of the class described, the combination with a handle, of a cutting-blade spaced from the lower end of the handle, and brace-arms attached to the blade and connected to the lower end of the handle at separated points, said arms constituting an open-topped receiving-basket in rear of the blade for the vegetables cut by the blade.

7. In a vegetable-harvesting implement of the class described, the combination with a handle, of a forwardly-extending cutting-blade having its front edge sharp, said blade being spaced from the lower end of the handle, and spaced sets of arms connecting the lower end of the handle and blade and forming an open-topped receiving-basket for the articles cut by said blade, one set constituting the sides of the basket and the other set the bottom thereof.

8. In a vegetable-harvesting implement of the class described, the combination with a handle, of a cutting-blade arranged contiguous to one end thereof, said blade having an intermediate notch and coiled edges on opposite sides of the notch, of arms connecting the handle and blade and having their ends secured within the coiled edges.

9. In a vegetable-harvesting implement of the class described, the combination with a handle, of a cutting-blade spaced from the lower end of the handle, and spaced sets of arms connecting the lower end of the handle and blade and forming a receiving-basket for the vegetables cut by said blade.

10. In a vegetable-harvesting device of the class described, the combination with a handle, of a cutting-blade spaced from the lower end of the handle, means connecting the blade and lower end of the handle and constituting the bottom of a receiving-basket for vegetables cut by the blade, and separate means located above and spaced from the first-mentioned means and forming the sides of the basket.

11. In a vegetable-harvesting implement of the class described, the combination with a handle, of a cutting-blade spaced from the lower end of the handle, and spaced sets of arms connecting the lower end of the handle and blade and forming an open-topped receiving-basket for vegetables cut by said blade, both sets of arms being bowed laterally, and one set having portions that are located above the other, constituting the sides of the basket, the lower arms being depressed downwardly, forming the bottom of the basket.

In testimony that we claim the foregoing as our own we have hereto affixed our signatures in the presence of two witnesses.

JOSEPH W. FEATHERS.
GEORGE MILLS.

Witnesses:
WILLIAM COLLINS,
LOUIS M. BULL.